United States Patent [19]
Hou

[11] Patent Number: 6,138,188
[45] Date of Patent: Oct. 24, 2000

[54] BUFFER MANAGEMENT DEVICE AND METHOD FOR IMPROVING BUFFER USAGE AND ACCESS PERFORMANCE IN DATA PROCESSING SYSTEM

[75] Inventor: Chien-Tzu Hou, Fremont, Calif.

[73] Assignee: Mentor Arc Inc., Fremont, Calif.

[21] Appl. No.: 09/162,238

[22] Filed: Sep. 28, 1998

[51] Int. Cl.[7] .................................................. G06F 12/00
[52] U.S. Cl. ............................ 710/52; 711/118; 711/156; 711/207
[58] Field of Search ........................... 710/52–57, 72–74; 711/118–136, 156–160, 203–207; 358/444; 326/62; 382/245; 395/109

[56] References Cited

U.S. PATENT DOCUMENTS

| | | | |
|---|---|---|---|
| 4,441,208 | 4/1984 | Iida ........................................ | 382/245 |
| 4,974,171 | 11/1990 | Yeh et al. ............................... | 395/109 |
| 5,133,058 | 7/1992 | Jensen .................................... | 711/207 |
| 5,378,944 | 1/1995 | Gochi ..................................... | 326/62 |
| 5,384,645 | 1/1995 | Hasegawa et al. ..................... | 358/444 |
| 5,675,763 | 10/1997 | Mogul .................................... | 711/135 |
| 5,809,562 | 9/1998 | Gaskins et al. ........................ | 711/207 |
| 5,826,109 | 10/1998 | Abramson et al. ..................... | 710/39 |
| 6,014,732 | 1/2000 | Naffziger ............................... | 711/203 |

*Primary Examiner*—Christopher B. Shin
*Attorney, Agent, or Firm*—Townsend and Townsend and Crew LLP

[57] ABSTRACT

A buffer management device and method for improving buffer usage and access performance in a data processing system. A buffer device is located between two components in the data processing system and can be operated in the line mode and page mode. The buffer device typically comprises a number of memory blocks for temporarily storing the transmitted data, first tag memories, second tag memories and a mode-switching circuit. Each of the memory blocks includes a plurality of memory segments. In the line mode, the first tag memories store the addressing information and the memory blocks serve as the data storage unit. In the page mode, the second tag memories store the addressing information and the memory segments serve as the data storage unit. Therefore, data carried by different requests can be merged into the same memory block.

12 Claims, 7 Drawing Sheets

BUFFER MANAGEMENT DEVICE AND METHOD FOR IMPROVING BUFFER USAGE AND ACCESS PERFORMANCE IN DATA PROCESSING SYSTEM

BACKGROUND OF THE INVENTION

1. Field of the Invention

The present invention generally relates to data-buffering technology in a data processing system. More specifically, the present invention relates to a buffer management device for improving buffer usage and reducing page-miss occurrences while accessing buffer devices in the system controller of a data processing system.

2. Description of the Related Art

Data buffering is a critical issue in modern data processing systems. Generally speaking, data-buffering techniques are used in two operation environments for improving the performance of data transmission. The first operation environment is where the source terminal and destination terminal operate at different operating speeds. An example is a communication system wherein the source terminal operates at a higher operating speed than the destination terminal. Therefore, the destination terminal needs enough buffer memory for buffering incoming data. The second operation environment is where there are many source devices but very few or only one destination device. For example, a system controller in a data processing system needs one or more buffer devices to effectively manipulate the data transfer between the connected devices.

FIG. 1 (Prior Art) illustrates a block diagram of a portion of a conventional data processing system in the neighborhood of the system controller 20. As shown in FIG. 1, system controller 20 is connected, or coupled, to processor 10, display system 60, peripheral bus 32 and main memory 40. The functions of these components in the data processing system will be briefly described as follows.

Processor 10 is typically the processing center of the data processing system, and is used to receive instructions and sequentially execute them. During the execution period, processor 10 fetches required program or data code from storage media and returns an execution result. Main memory 40, usually implemented by Dynamic Random Access Memories (DRAMs), is typically the primary program/data source since it has a shorter access time than most other storage media except Static Random Access Memories (SRAMs). Peripheral bus 32 is used to bridge, or connect, other peripheral devices with the data processing system. Hereinafter, when discussing peripheral bus 32, it will be understood that the discussion equally applies to the devices connected to peripheral bus 32. Display system 40 is used to visually display the user interface of the data processing system. Traditionally, the display of display system 60 is established through a video card connected to peripheral bus 32. Modern data processing systems adopt a new architecture to directly couple display system 60 and system controller 20 for improving the display performance. Finally, system controller 20 is a bridge device for interfacing processor 10, display system 60, peripheral bus 32 and main memory 40, as shown in FIG. 1.

FIG. 1 also shows the typical buffer devices of system controller 20 for controlling data transfer between the connected components, including processor 10, display system 60 and peripheral bus 32, to a destination component, usually main memory 40. The buffer devices of system controller 20 shown in FIG. 1 comprise memory controller 201, processor buffer 203, display buffer 205, peripheral buffer 207 and buffer management circuit 209.

Processor buffer 203, display buffer 205 and peripheral buffer 207 are used to buffer incoming data or requests from processor 10, display system 60 and peripheral bus 32, respectively. Each of these buffers (203, 205, 207) can temporarily store several items of data. In addition, the operations of processor buffer 203, display buffer 205 and peripheral buffer 207 are controlled by buffer management circuit 209. Memory controller 201, which is responsible for physically accessing main memory 40, sequentially processes the data stored in these buffers. Briefly speaking, processor 10, display system 60 and peripheral bus 32 issue data to the corresponding buffer devices under the control of buffer management circuit 209. Then memory controller 201 performs the access operations for transferring the data stored in these buffer devices into main memory 40. It is clear that FIG. 1 only exhibits an example for transmitting data from several components (processor 10, display system 60 and peripheral bus 32) to main memory 40 and is not intended to limit the scope of the present invention.

Processor buffer 203, display buffer 205 and peripheral buffer 207 each typically include a number of memory blocks. Each of the memory blocks can buffer one data item, regardless of size. FIG. 2 (Prior Art) illustrates a schematic diagram of the internal structure of processor buffer 203 in a conventional data processing system. Processor buffer 203, as shown in FIG. 2 in simplified form, comprises four memory blocks, denoted by 203a, 203b, 203c and 203d, respectively. In addition, each memory block comprises thirty-two memory units, wherein each memory unit is equivalent to a byte in the present example. However, it is understood by those skilled in the art that the number of memory units contained in each memory block can be altered as desired for a particular application.

Memory blocks 203a, 203b, 203c and 203d temporarily store data contained in the request issued from processor 10. In FIG. 2, slashed portions in the memory blocks 203a–203d represent memory units containing stored data. Generally, memory controller 201 sequentially processes the data stored in these memory blocks. Furthermore, as shown in FIG. 2, there are four tag memories 209a–209d embedded in buffer management circuit 209 that are dedicated to memory blocks 203a–203d, respectively. These tag memories (209a, 209b, 209c and 209d) store addressing information of the data stored in the corresponding memory blocks (203a, 203b, 203c and 203d). Generally speaking, each tag memory stores the common bits of the addresses corresponding to each memory unit in the corresponding memory block.

Assume that a complete address for addressing any data stored in a memory block contains thirty-two bits in this example, namely, $a_{31}$:$a_0$. Therefore, each of tag memories 209a–209d should at least store 27 bits, that is, $a_{31}$:$a_5$, which are the common bits of the addresses for all memory units in the same memory block. The relationship between the addressing information stored in the tag memory and the data stored in the corresponding memory block can be explained by the following example. Assume that the addressing information stored in tag memory 209a is AF01A1[100]. The address notations are briefly described as follows. The addressing information "AF01A1", which is not enclosed by brackets, is in the hexadecimal format and corresponds to address bits $a_{31}$:$a_8$ in this case. In addition, the addressing information "[100]", which is enclosed by brackets, is in the binary format and corresponds to address bits $a_7$:$a_5$. According to the addressing information contained in tag memory 209a and the sequence of the memory units, the location of data (shaded in memory block 203a) temporarily stored in memory block 203a is identified. FIG.

3 (Prior Art) schematically illustrates the addressing mechanism in memory block 203a. According to the addressing mechanism shown in FIG. 3, the addresses for the data stored in memory block 203a are AF01A14A-AF01A14E.

However, it is evident that conventional buffer devices do not efficiently use buffer memory. In the conventional buffer, any data containing only one or a few bytes is still required to occupy one memory block, such as is shown regarding memory blocks 203b and 203c in FIG. 2. A conventional solution is to reduce the number of memory units contained in each memory block. For example, the number of memory units can be reduced to eight, thereby improving the memory usage of memory blocks like 203b and 203c in FIG. 2. However, this modification may complicate the handling processes for the data stored in memory block 203d.

In addition, the particular accessing mode, such as the page-hit access mode or page-miss access mode, has an influence on the memory access speed. Generally speaking, a page-hit access requires fewer processing cycles than a page-miss access does. For example, in a memory system operating at 100 MHz, a page-hit access requires about 5 clock cycles to be processed, whereas a page-miss access requires about 13 clock cycles to be processed. In fact, the data issued from the various sources, such as processor 10, display system 60 and peripheral bus 32, are random. Consequently, page-miss occurrences are quite high. Therefore, reducing page-miss occurrences is an approach to improving overall system performance.

SUMMARY OF THE INVENTION

The present invention provides a buffer management device having an improved memory-usage mechanism for effectively buffering data transferred between various components, such as the data transmitted from the processor, the display system and the peripheral devices to the main memory in the data processing system. The buffer management device of the present invention also reduces the occurrences of page-miss memory accessing, thereby improving the performance of the buffer system.

According to preferred aspects, the buffer management device buffers data transmitted from a first component to a second component in a data processing system. The buffer device comprises a number of memory blocks for temporarily storing the data transmitted from the first component to the second component. Each of the memory blocks has a number of memory segments and each of the memory segments has a number of memory units.

The buffer device can be operated in two operation modes. The first operation mode is called the line mode, in which each of the memory blocks only stores one data item. The second operation mode is called the page mode, in which each of the memory blocks stores several data items. More specifically, each of the segments in the same memory block stores one data item in the page mode.

The buffer device further comprises several first tag memory devices coupled to corresponding memory blocks. These first tag memory devices store addressing information pertaining to the memory units of the corresponding memory blocks in the line mode. In addition, the buffer device further comprises several second tag memory devices coupled to corresponding memory blocks. These second tag memory devices store addressing information pertaining to the memory units of the corresponding memory blocks in the page mode. Each of the second tag memory devices has a higher-bit tag memory for storing common bits of the addressing information pertaining to the memory units of the corresponding memory blocks, and a number of lower-bit tag memories for storing common bits of the addressing information pertaining to the memory units of the corresponding memory segments.

The buffer device includes a mode-switching circuit for switching the operation mode of each memory block. According to the relationship between the addressing information of the data inputted from the first component and the addressing information stored in the tag memory devices, the mode-switching circuit activates each of the memory blocks to be operated in the line mode or the page mode.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

The present invention adopts mode-switching techniques to improve memory usage and to reduce page-miss occurrences in the memory system. In one embodiment, a buffer device according to the present invention is installed in the system controller, which is responsible for bridging or connecting various devices, such as the processor, the main memory and other peripheral devices in the data processing system. However, it is understood by those skilled in the art that the invention can also be applied, with some suitable modifications, to other applications that need data buffering.

Figure 4:
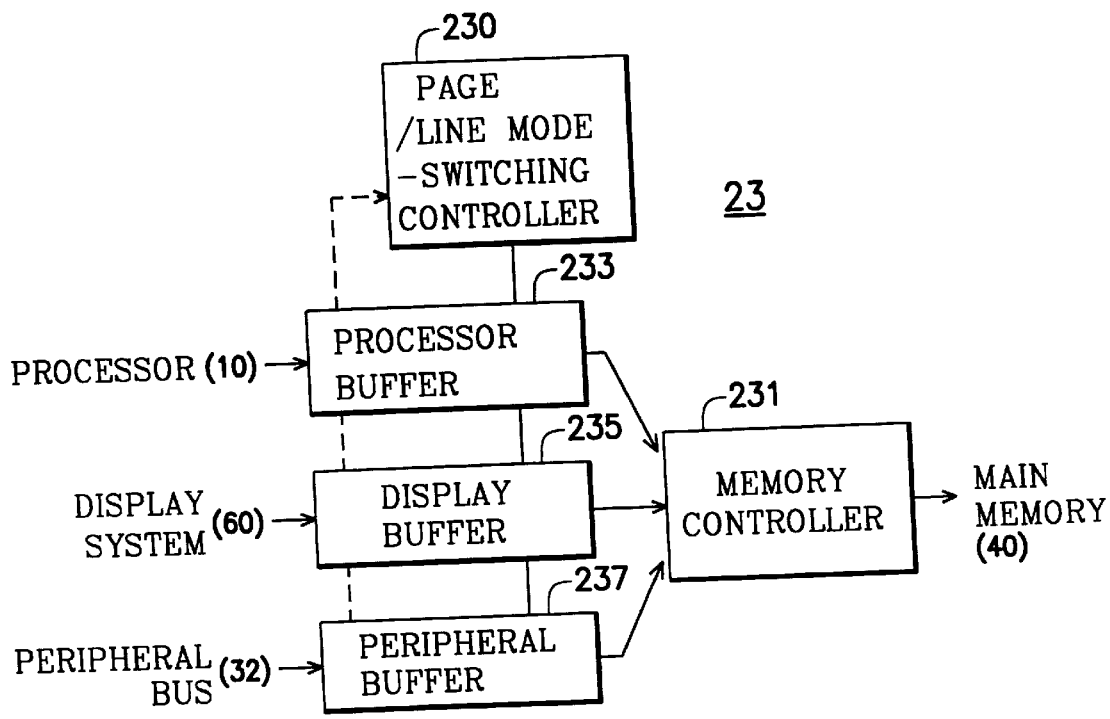
FIG. 4 is a block diagram of a system controller in accordance with an embodiment of the present invention.

FIG. 4 is a block diagram of a system controller 23 according to an embodiment of the present invention. System controller 23 receives data from processor 10, display system 60 and peripheral bus 32 and sequentially transfers the data to main memory 40. As shown in FIG. 4, system controller 23 comprises a memory controller 231, a processor buffer 233, a display buffer 235, a peripheral buffer 237 and a page/line mode-switching controller 230.

Referring to FIG. 4, processor buffer 233, display buffer 235 and peripheral buffer 237 are used to temporarily store the data transferred from processor 10, display system 60 and peripheral bus 32, respectively. These memory buffers are comprised of a number of memory blocks, each of which preferably has thirty-two memory units or bytes. In addition, these thirty-two memory units are preferably divided into four memory segments each containing eight memory units. Therefore, each memory block contains four memory segments and each memory segment contains eight memory units according to one embodiment. In addition, the memory blocks and the memory segments serve as storage units for each data item in the line mode and in the page mode, respectively, as will be described later.

Memory controller 231 retrieves data stored in processor buffer 233, display buffer 235 and peripheral buffer 237 and controls the physical transfer to main memory 40. In addition, memory controller 231 maintains the data coherency of main memory 40. That is, the sequence for processing two or more access requests to access main memory 40 cannot make the data stored in main memory 40 invalid. For example, suppose processor 10 executes some instructions and obtains a result. Processor 10 then writes the result to main memory 40, and waits for a peripheral device to read out the result from main memory 40. In this case, it is clear that the result must first be written to main memory 40 before the peripheral device can actually access the result from main memory 40. Therefore, memory controller 231 maintains the processing order of the two access requests. In addition, the relationship between the two or more access requests can be acquired by the addressing information contained within the requests.

Figure 1:
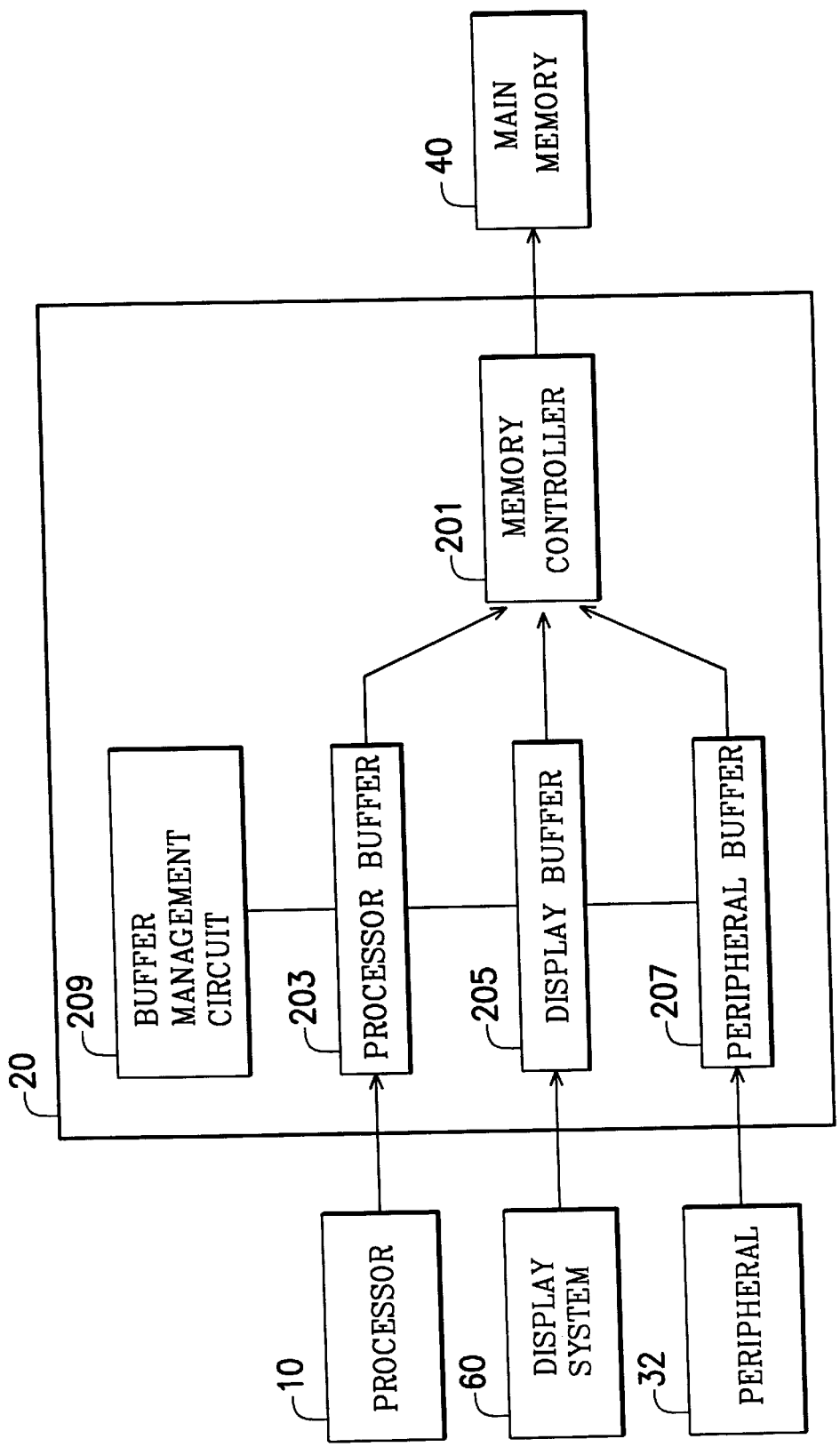
FIG. 1 (Prior Art) is a block diagram of a portion of a conventional data processing system in the neighborhood the system controller.
Figure 2:
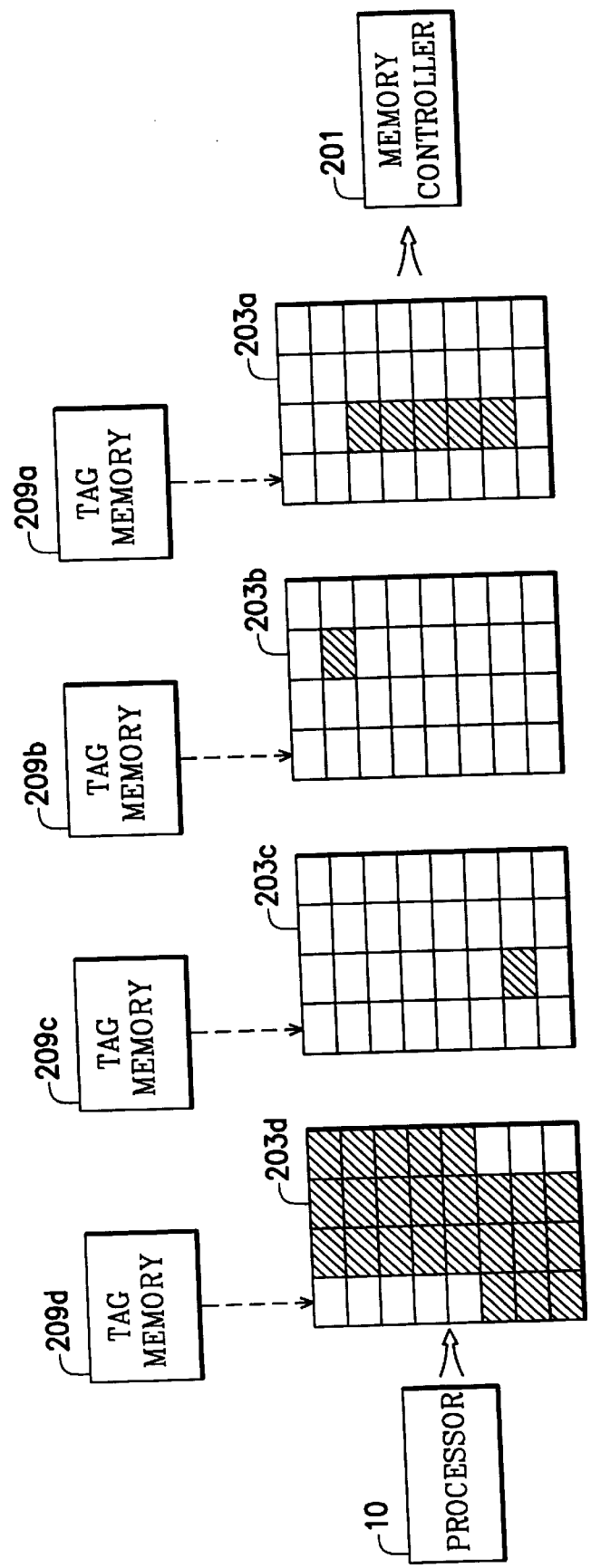
FIG. 2 (Prior Art) is a schematic diagram of the internal structure of the processor buffer shown in FIG. 1.
Figure 3:
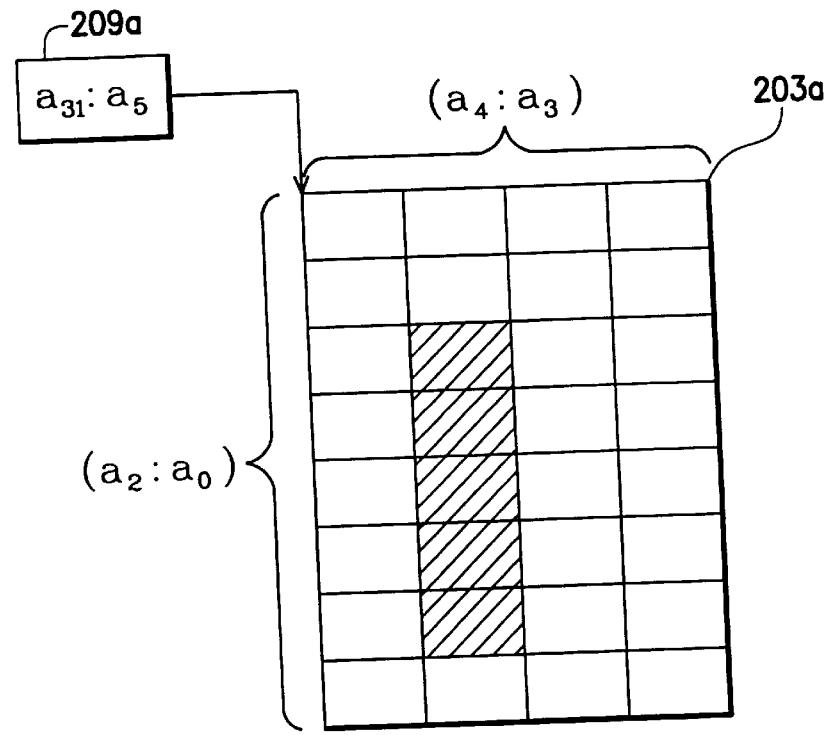
FIG. 3 (Prior Art) schematically illustrates the addressing mechanism in a conventional memory block.

Page/line mode-switching circuit 230, according to one embodiment, not only functions like a conventional buffer management circuit as shown in FIG. 1, but mode-switching circuit 230 is also capable of individually switching the operation modes of processor buffer 233, display buffer 235 and peripheral buffer 237. In this embodiment, page/line mode switching circuit 230 uses different tag memories for the two predefined operation modes.

Figure 5:
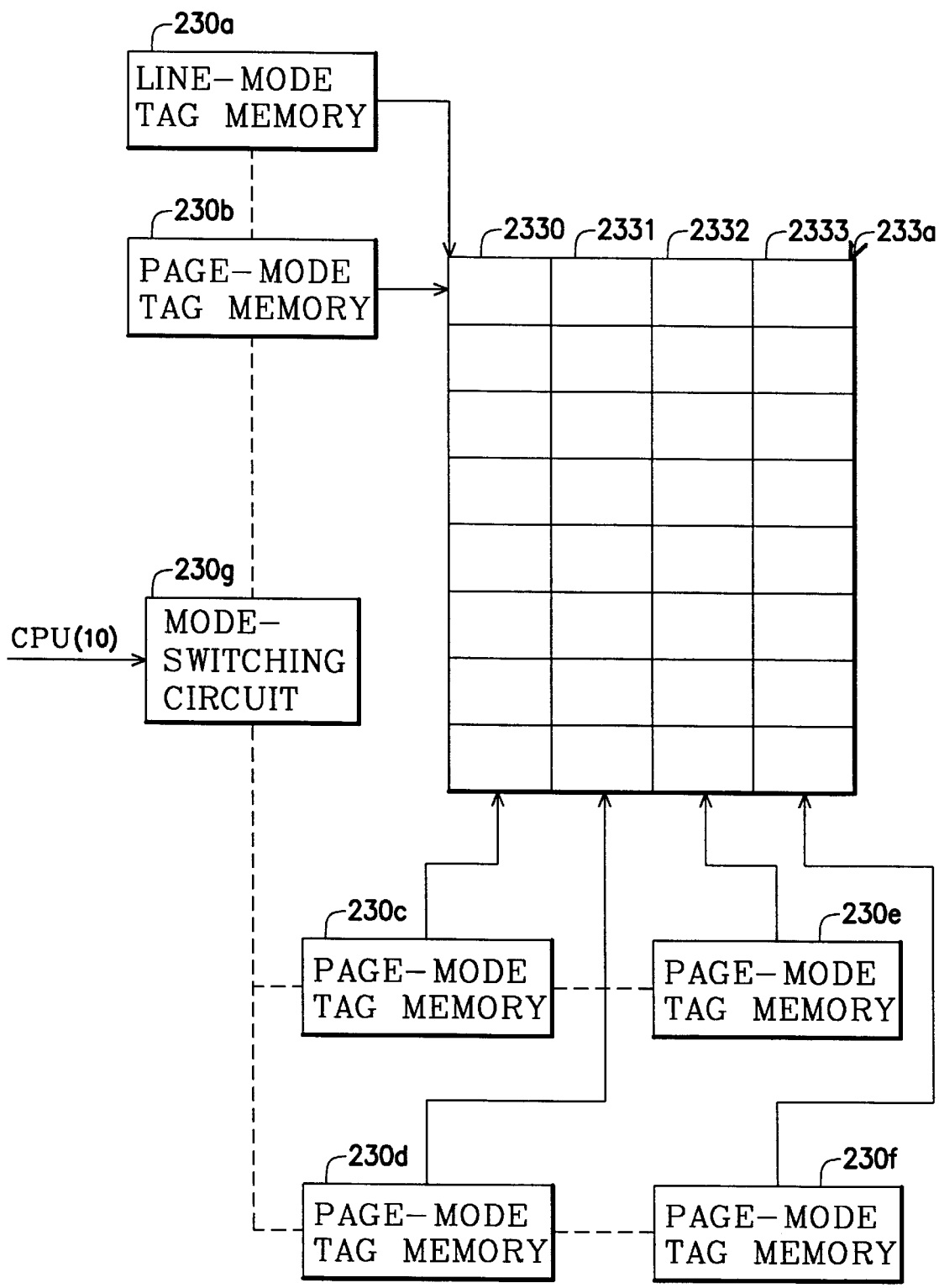
FIG. 5 is a schematic diagram showing the addressing configuration for a memory block according to an embodiment of the present invention.

FIG. 5 is a schematic diagram showing the addressing configuration for memory block 233a of processor buffer 233 according to an embodiment of the present invention. In this embodiment, line-mode tag memory 230a, page-mode tag memories 230b–230f and mode-switching circuit 230g are included in page/line mode-switching circuit 230. Memory block 233a can be addressed by line-mode tag memory 230a in the line mode or by page-mode tag memories 230b–230f in the page mode. The selection of the operation mode for memory block 233a is made by mode-switching circuit 230g according to the interpretation of the addressing information contained in the data or request issued from processor 10.

Generally, memory block 233a is initially operated in the line mode and uses line-mode tag memory 230a to store the addressing information of the data stored therein. In other words, memory block 233a can only buffer one data item in the line mode. If mode-switching circuit 230g determines that the incoming request or data, and the data currently stored in memory block 233a, can be processed by one page-mode memory access, mode-switching circuit 230g will enable page-mode operation by disabling line-mode tag memory 230a and enabling page-mode tag memories 230b–230f for storing the corresponding addressing information. As shown in FIG. 5, memory block 233a has four memory segments 2330–2333, each of which can buffer one data item in the page mode. In addition, page-mode tag memory 230b is used for storing common bits of the addressing information of the data stored in memory block 233a. Page-mode tag memories 230c–230f are used for storing common bits of the addressing information of the data stored in the corresponding memory segments 2330–2333, respectively. In memory segment 2330, for example, page-mode tag memory 230b is used to store the higher common bits of the addresses pertaining to the data stored therein, and page-mode tag memory 230c is used to store the lower common bits of the addresses pertaining to the data stored therein. This addressing mechanism is also applied to other memory segments.

Figure 6A:
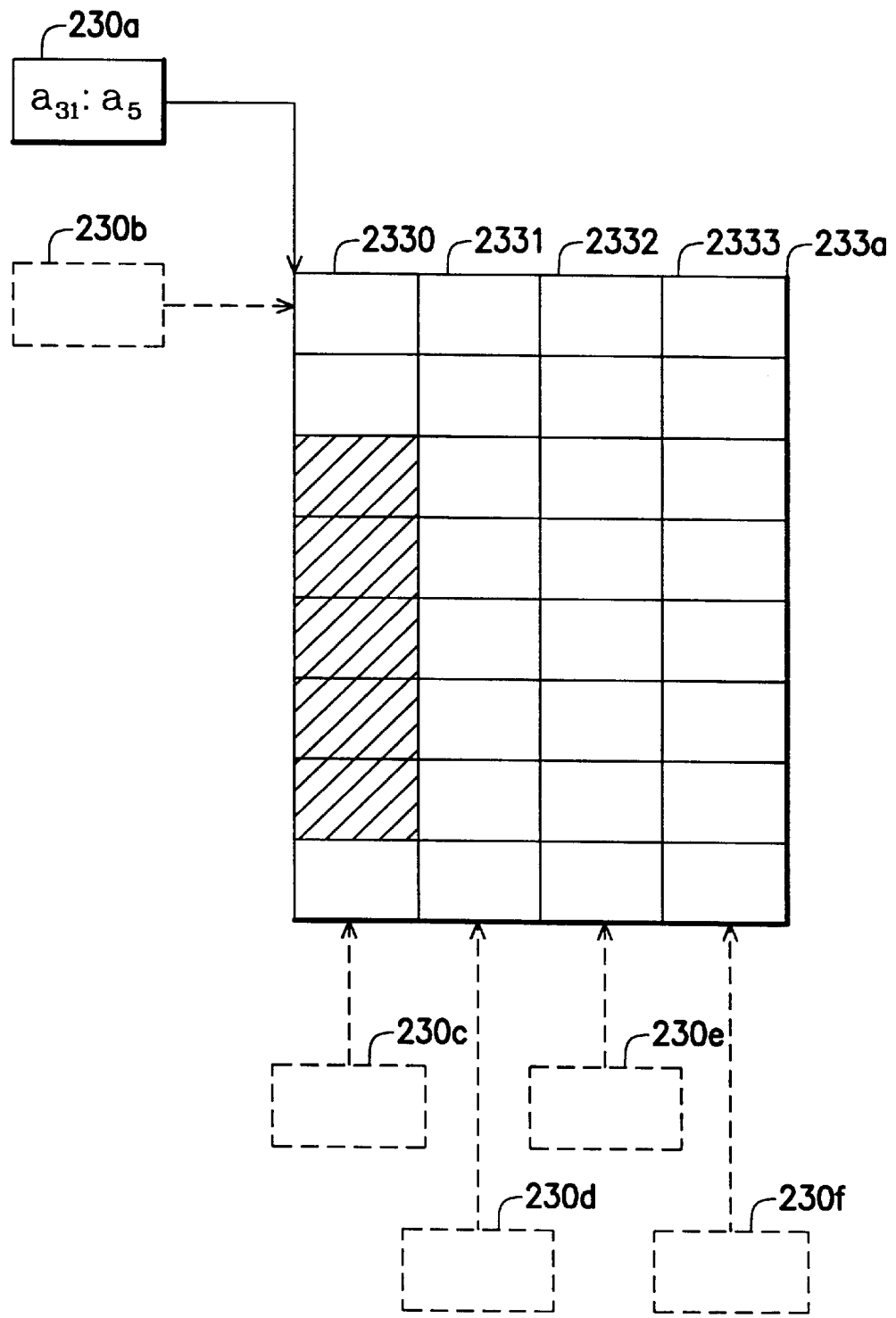
FIG. 6A illustrates the addressing configuration for a memory block in the line mode.
Figure 6B:
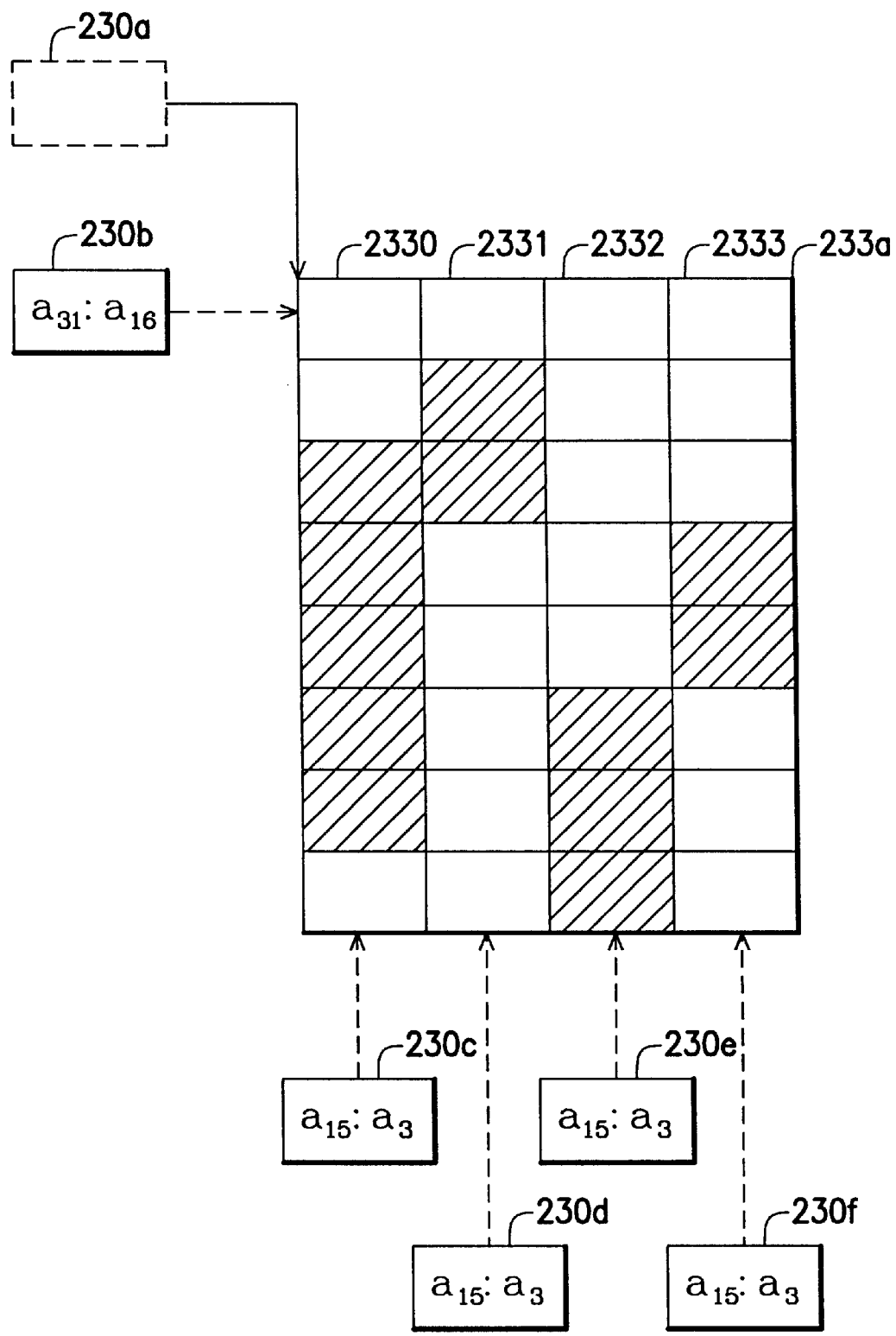
FIG. 6B illustrates the addressing configuration for a memory block in the page mode.

FIGS. 6A and 6B illustrate the addressing configuration for a memory block in the line mode and in the page mode, respectively. In the line mode, as shown in FIG. 6A, line-mode tag memory 230a is enabled (marked by solid lines) and page-mode tag memories 230b–230f are disabled (marked by dash lines). At this time, line-mode tag memory 230a stores the common bits of the addresses pertaining to the data stored in memory block 233a, that is, the bits $[a_{31}:a_5]$. In other words, the higher bits, $[a_{31}:a_5]$, of the addresses for the memory units in the same memory block are the same and the lower bits, $[a_4:a_0]$, of the addresses, which correspond to the sequence of the memory units, are different. Therefore, memory block 233a only stores one data item.

In the page mode, as shown in FIG. 6B, page-mode tag memories 230b–230f are enabled (marked by solid lines) and line-mode tag memory are disabled (marked by dash lines). In this example, memory segments 2330–2333, and not the whole memory block 233a, individually serve as the data storage units. That is, each of memory segments 2330–2333 can independently store one data item. Page-mode tag memory 230b stores the common bits of the addresses pertaining to the data stored in the memory units of memory block 233a. In this case, page-mode tag memory 230b stores the address bits $[a_{31}:a_{16}]$. In addition, page-mode tag memories 230c–230f stores the common bits of the addresses pertaining to the data stored in the memory units of the corresponding memory segments 2330–2333. In this case, page-mode tag memories 230c–230f store the address bits $[a_{15}:a_3]$. For example, the address for each of the memory units in memory segment 2330 are obtained by combining the bits $[a_{31}:a_{15}]$ stored in page-mode tag memory 230b, the bits $[a_{15}:a_3]$ stored in page-mode tag memory 230c, and each memory unit's own sequence. Similarly, the bits $[a_{15}:a_3]$ stored in page-mode tag memory 230d, rather than those in page-mode tag memory 230c, are used for addressing the memory units of memory segment 2331. Likewise, the memory units in memory segments 2332 and 2333 are addressed in a similar manner using page-mode tag memories 230a and 230f, respectively.

Figure 7:
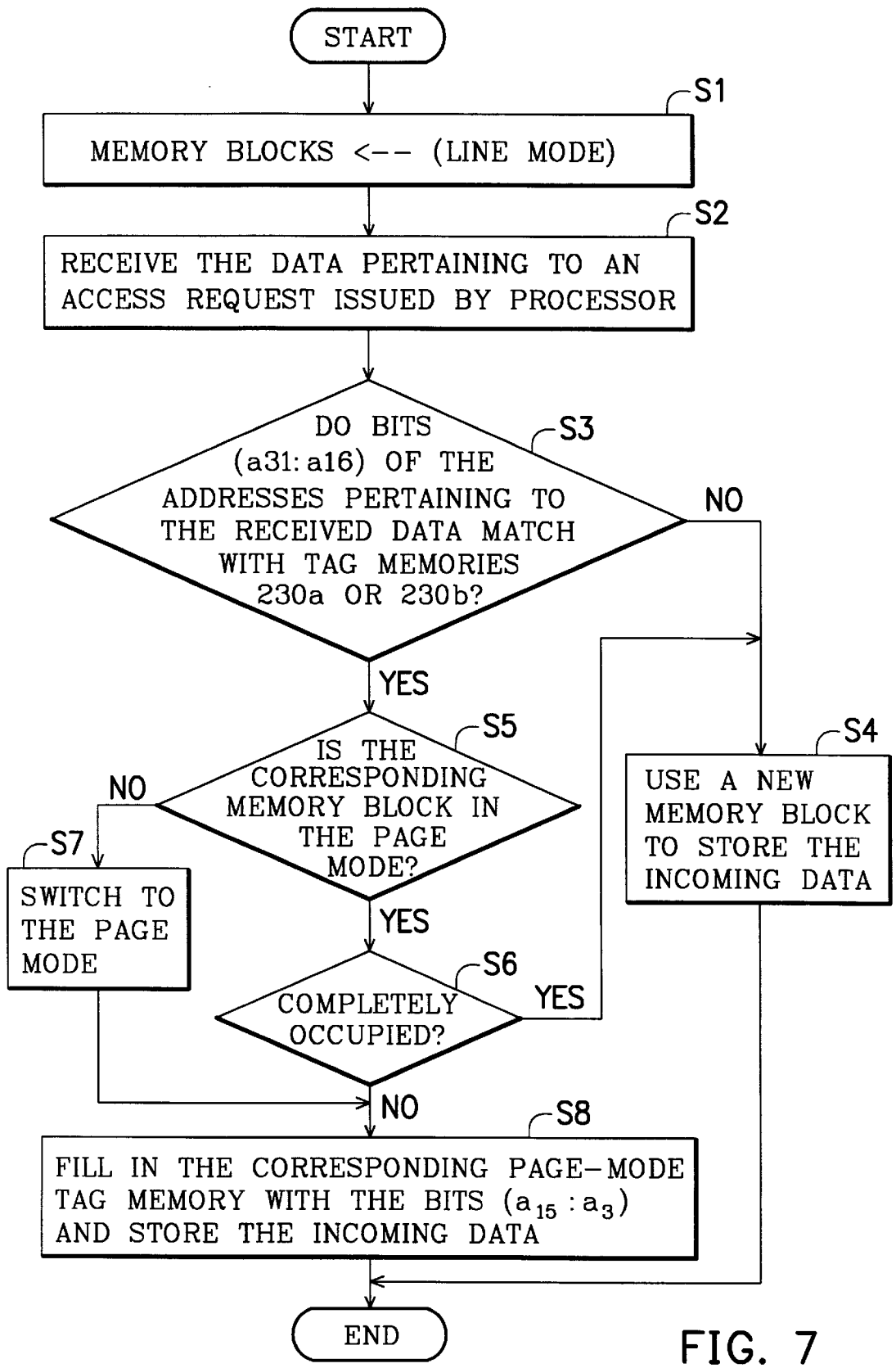
FIG. 7 is a flowchart of the operation of the page/line mode switching circuit according to an embodiment of the present invention.

FIG. 7 is a flowchart of the operation of the mode-switching circuit 230g in FIG. 5. Mode-switching circuit 230g only controls processor buffer 233 in this example. However, it is understood by those skilled in the art that the same controlling scheme can be applied to other buffer devices, such as display buffer 235 and peripheral buffer 237. Assume that all memory blocks of processor buffer 233 are initially operating in the line mode (step S1). When the data pertaining to an access request issued by processor 10 is received (step S2), mode-switching circuit 230g checks the correspondence between the addressing information pertaining to the received data and the contents of these tag memories.

In other words, mode-switching circuit 230g checks whether the higher bits $[a_{31}:a_{16}]$ of the addresses pertaining to the received data match with the contents of line-mode tag memory 230a or page-mode tag memory 230b (step S3). If there is no match, then the received data cannot be merged into any presently used memory blocks. Therefore, mode-switching circuit 230g uses a new memory block to store the incoming data (step S4).

If the bits $[a_{31}{:}a_{16}]$ of the addresses pertaining to the received data are equivalent to the addressing information (bits $[a_{31}{:}a_{16}]$) of either line-mode tag memory 230a or page-mode tag memory 230b, mode-switching circuit 230g then checks whether the corresponding memory block is in the page mode (step S5). If it is in the page mode, mode-switching circuit 230g then further determines whether the corresponding memory block is completely occupied (step S6), that is, whether the corresponding memory block has any available memory segments remaining. If the corresponding memory block has no available memory segments, then mode-switching circuit 230g uses a new memory block to store the incoming data, similar to the process performed in step S4. If the corresponding memory block has at least one available memory segment, mode-switching circuit 230g fills in the corresponding page-mode tag memory (230d or 230e or 230f, for example) with the bits $[a_{15}{:}a_3]$ of the addresses pertaining to the incoming data and stores the incoming data (step S8).

Returning to step S5, if the corresponding memory block is in the line mode, rather than in the page mode, mode-switching circuit 230g switches the corresponding memory block to the page mode (step S7). As described above, switching from the line mode to the page mode requires enabling page-mode tag memories 230b–230f and disabling line-mode tag memory 230a. Furthermore, the addressing information that relates to the original data stored in this memory block and stored in line-mode tag memory 230a is converted and stored in page-mode tag memory 230b and page-mode tag memory 230c. More specifically, the bits $[a_{31}{:}a_{16}]$ of the addresses stored in line-mode tag memory 230a are moved to page-mode tag memory 230b and the bits $[a_{15}{:}a_5]$ of the addresses stored in line-mode tag memory 230a and the address bits $[a_4{:}a_3]$ implied by the first memory segment 2330 (i.e. 00) are moved to page-mode tag memory 230c. In this manner, the operation mode of the corresponding memory block is successfully changed to the page mode. Finally, mode-switching circuit 230g fills in the corresponding page-mode tag memory with the bits $[a_{15}{:}a_3]$ of the addresses pertaining to the incoming data and stores the incoming data, similar to the operation performed in step S8.

Referring to FIG. 6A and FIG. 6B, an example of a buffering management process in accordance with one embodiment is illustrated for explanation. Memory block 233a is initially operated in the line mode, as shown in FIG. 6A. Assume that the contents of line-mode tag memory 230a are AF01A1[100], $[a_{31}{:}a_5]$ in this example. Accordingly, the addresses pertaining to the shaded region, which means the data storage locations in memory block 233a, are AF01A182-AF01A186.

When receiving any data issued by processor 10 having addresses in which the higher bits $[a_{31}{:}a_{16}]$ are AF01, mode-switching circuit 230g changes the operation mode of memory block 233a from the line mode to the page mode. In other words, line-mode tag memory 230a is disabled and page-mode tag memories 230b–230f are enabled, as shown in FIG. 6B. Before dealing with the subsequent data required to be buffered, mode-switching circuit 230g deals with the addresses pertaining to the data originally stored therein in the line mode. Accordingly, mode-switching circuit 230g first stores the bits $[a_{31}{:}a_{16}]$ originally stored in line-mode tag memory 230a, which are AF01 in this case, into page-mode tag memory 230b. Next, mode-switching circuit 230g stores the remaining bits $[a_{15}{:}a_5]$ (A1[100] in this example) stored in line-mode tag memory 230a and bits $[a_4{:}a_3]$ derived from the sequence information ([00] in this example) to page-mode tag memory 230c.

After processing the original data stored in memory block 233a, mode-switching circuit 230g then sequentially processes the incoming data. It is noted that page-mode tag memory 230b, which is used to store the higher common bits of the addressing information pertaining to all the memory units of memory block 233a, has been filled in with "AF01". As shown in FIG. 6B, three more data items are sequentially stored in memory segments 2331–2333. The addresses pertaining to each of the data items can be obtained in view of the contents of page-mode tag memory 230b (bits $[a_{31}{:}a_{16}]$) and the corresponding page-mode tag memories 230c–230f (bits $[a_{15}{:}a_3]$), and their sequence within the corresponding memory segment. For example, if page-mode tag memory 230d stores the addressing information of BA3[0] (bits $[a_{15}{:}a_3]$), the addresses pertaining to the data item now stored in memory segment 2331 are AF01BA31-AF01BA32. In the same manner, if the contents of page-mode tag memory 230e are 37B[1], the addresses pertaining to the data item stored in memory segment 2332 are AF0137BD-AF0137BF. Therefore, in this embodiment, memory block 233a can only store up to four data items in the page mode.

According to the above description, the buffer management device disclosed herein has several advantages. First, the buffer device uses less memory space to buffer more incoming data in some circumstances. It is clear that the page-mode operation has a superior memory usage performance than the line-mode operation. More importantly, the buffer device in accordance with the present invention can be switched between the line mode and the page mode in view of the incoming data. Thus, the buffer device still uses the line mode to handle a data request containing a lot of data. Therefore, the memory usage and the system performance of the buffer device are not compromised. Second, the buffer device reduces memory access time while some memory blocks operate in the page mode. A page-hit memory access takes a shorter time than a page-miss memory access does. Accordingly, reducing the occurrences of page-miss memory accesses results in shortened memory access times. In the page mode, several requests contained in the same memory block can be processed by one page-hit memory access. Therefore, the practical memory-access time is shortened.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A buffer management device for buffering data transmitted from a first component to a second component in a data processing system, the device comprising:

a plurality of memory blocks, coupled between the first component and the second component, for temporarily storing the data transmitted from the first component to the second component, each of the memory blocks having a plurality of memory segments, and each of the memory segments having a plurality of memory units;

a plurality of first tag memories, corresponding to the plurality of memory blocks, respectively, for storing addressing information pertaining to the memory units of the corresponding memory blocks in a first mode in which each of the memory blocks serves as a data storage unit;

a plurality of second tag memories, corresponding to the plurality of memory blocks, respectively, for storing addressing information pertaining to the memory units of the corresponding memory blocks in a second mode in which each of the memory segments serves as the data storage unit; and a mode-switching circuit, coupled to the memory blocks, the first tag memories and the second tag memories, for activating each of the memory blocks to be operated in the first mode or in the second mode according to the addressing information pertaining to the data inputted from the first component.

2. The buffer management device as recited in claim 1, wherein each of the first tag memories comprises:

a first-mode tag memory for storing common bits of the addressing information pertaining to the memory units of the corresponding memory block.

3. The buffer management device as recited in claim 1, wherein each of the second tag memories comprises:

a second-mode higher-bit tag memory for storing common bits of the addressing information pertaining to the memory units of the corresponding memory blocks; and a plurality of second-mode lower-bit tag memories, corresponding to the memory segments, respectively, for storing common bits of the addressing information pertaining to the memory units of the corresponding memory segments.

4. The buffer management device as recited in claim 1, wherein the second component is a main memory of the data processing system, and the first component is selected from the group consisting of a processor, a display system and a peripheral bus.

5. The buffer management device as recited in claim 4, wherein the buffer device is embedded in a system controller of the data processing system.

6. A buffer management device for buffering data transmitted from a plurality of source components to a destination component in a data processing system, the device comprising:

a plurality of buffer memory devices, coupled between the corresponding source components and the destination component, respectively, for temporarily storing data transmitted from the corresponding source component to the destination component, each of the buffer memory devices having a plurality of memory blocks, each of the memory blocks having a plurality of memory segments, and each of the memory segments having a plurality of memory units;

a plurality of first tag memories, coupled to the corresponding memory blocks of the buffer memory devices, respectively, for storing addressing information pertaining to the memory units of the corresponding memory blocks in a first mode in which each of the memory blocks serves as a data storage unit;

a plurality of second tag memories, coupled to the corresponding memory blocks of the buffer memory devices, respectively, for storing addressing information pertaining to the memory units of the corresponding memory blocks in a second mode in which each of the memory segments serves as the data storage unit; and a mode-switching circuit, coupled to the buffer memory devices, the first tag memories and the second tag memories, for activating each of the memory blocks to be operated in the first mode or in the second mode according to the addressing information pertaining to the data inputted to the corresponding buffer memory devices.

7. The buffer management device as recited in claim 6, wherein each of the first tag memories comprises:

a first-mode tag memory for storing common bits of the addressing information pertaining to the memory units of the corresponding memory block.

8. The buffer management device as recited in claim 6, wherein each of the second tag memories comprises:

a second-mode higher-bit tag memory for storing common bits of the addressing information pertaining to the memory units of the corresponding memory blocks; and a plurality of second-mode lower-bit tag memories, corresponding to the memory segments, respectively, for storing common bits of the addressing information pertaining to the memory units of the corresponding memory segments.

9. The buffer management device as recited in claim 6, wherein the destination component is a main memory of the data processing system, and the source components include a processor, a display system and a peripheral bus.

10. The buffer device as recited in claim 9, wherein the buffer device is embedded in a system controller of the data processing system.

11. A method of buffering data transmitted from a first component to a second component in a data processing system, the method comprising the steps of:

temporarily storing the data transmitted from the first component to the second component in one of a plurality of memory blocks coupled between the first component and the second component, wherein each of the memory blocks includes a plurality of memory segments, wherein each of the memory segments includes a plurality of memory units, and wherein each of the memory blocks operates in one of a first mode in which the memory block serves as a data storage unit and a second mode in which each of the memory segments serves as the data storage unit;

storing addressing information pertaining to the memory units of said one memory block in a first tag memory corresponding to said one memory block when said one memory block operates in said first mode;

storing addressing information pertaining to the memory units of said one memory block in a plurality of second tag memories associated with the memory segments of said one memory block when said one memory block operates in said second mode; and switching the mode of operation of said one memory block, with a mode-switching circuit coupled to the plurality of memory blocks, to said first mode or said second mode according to the addressing information pertaining to the data inputted from the first component.

12. The method as recited in claim 11, wherein the plurality of second tag memories include a higher-bit tag memory and a plurality of lower-bit tag memories wherein each lower-bit tag memory is associated with one of the memory segments of said one memory block, and wherein the step of storing addressing information in the plurality of second tag memories includes the steps of:

storing common bits of the addressing information pertaining to the memory units of said one memory block in the higher-bit tag memory; and storing common bits of the addressing information pertaining to the memory units of the memory segments of said one memory block in the corresponding lower-bit tag memories.

* * * * *